(12) United States Patent
Wilm

(10) Patent No.: US 8,702,521 B2
(45) Date of Patent: Apr. 22, 2014

(54) METHODS FOR THE UNAMBIGUOUS ASSOCIATION OF AT LEAST ONE AUTONOMOUS STORAGE UNIT WITH AT LEAST ONE PLAYER IN A SCORE KEEPING DEVICE

(75) Inventor: Robert Wilm, Dresden (DE)

(73) Assignee: PublicSolution GmbH, Dresden (DE)

( * ) Notice: Subject to any disclaimer, the term of this patent is extended or adjusted under 35 U.S.C. 154(b) by 0 days.

(21) Appl. No.: 12/932,442

(22) Filed: Feb. 25, 2011

(65) Prior Publication Data

US 2011/0250973 A1    Oct. 13, 2011

Related U.S. Application Data

(63) Continuation of application No. 11/795,545, filed as application No. PCT/EP2005/000882 on Jan. 28, 2005, now abandoned.

(51) Int. Cl.
  *A63F 9/24* (2006.01)
  *A63F 13/00* (2006.01)
  *G06F 17/00* (2006.01)
  *G06F 19/00* (2011.01)

(52) U.S. Cl.
  USPC ............................................. 463/42; 463/25

(58) Field of Classification Search
  USPC .................................................... 463/25, 42
  See application file for complete search history.

(56) References Cited

U.S. PATENT DOCUMENTS

| | | | |
|---|---|---|---|
| 6,468,162 B1 * | 10/2002 | Nakamura | 463/43 |
| 6,577,733 B1 | 6/2003 | Charrin | 380/251 |
| 2002/0028710 A1 | 3/2002 | Ishihara et al. | 463/44 |
| 2002/0193157 A1 | 12/2002 | Yamada et al. | 463/9 |
| 2004/0092311 A1 | 5/2004 | Weston et al. | 463/42 |
| 2005/0101381 A1 * | 5/2005 | Hattori | 463/29 |

FOREIGN PATENT DOCUMENTS

| | | | | |
|---|---|---|---|---|
| DE | 10063412 | 6/2002 | | G06F 19/00 |
| WO | WO02/49733 | 6/2002 | | A63F 13/02 |

OTHER PUBLICATIONS

English version of the International Search Report dated Oct. 21, 2005 and English translation of the International Preliminary Report on Patentability (Chapter I of the Patent Cooperation Treaty) dated Jul. 31, 2007.

* cited by examiner

*Primary Examiner* — Milap Shah
*Assistant Examiner* — Jason Pinheiro
(74) *Attorney, Agent, or Firm* — Gerald T. Bodner

(57) ABSTRACT

A method for the unambiguous personal association of at least one autonomous storage unit (10) with at least one player in a score keeping device (20) in order to store at least one status of a game, especially a computer game, network game, or trading card game, is characterized in that an unambiguous identification feature that is effective in the game environment is allocated in a way clearly indicating the player's action to a game status, particularly an amount of properties of a game piece created and/or guided by the player and/or an amount of game situations created and/or managed by the player within the group of players detected by the score keeping device, the game status being created and/or managed by the player, being stored in the at least one autonomous storage unit, and unambiguously identifying the player.

11 Claims, 7 Drawing Sheets

METHODS FOR THE UNAMBIGUOUS ASSOCIATION OF AT LEAST ONE AUTONOMOUS STORAGE UNIT WITH AT LEAST ONE PLAYER IN A SCORE KEEPING DEVICE

CROSS-REFERENCE TO RELATED APPLICATIONS

This application is a continuation of co-pending U.S. application Ser. No. 11/795,545, filed on Apr. 16, 2008, and entitled, "Methods For The Unambiguous Association Of At Least One Autonomous Storage Unit With At Least One Player In A Score Keeping Device", the disclosure of which is incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to a method for the unambiguous personal association of at least one autonomous storage unit with at least one player in a score keeping device, in order to store at least one status of a game, or a player qualification.

2. Description of Related Art

A method for storing a game score, a score keeping device, and a computer device performing the method and representing the score keeping device, are known from DE 100 63 412 A1. With the method described therein, or the devices performing this method, it is possible to store game scores in games with several players, with a structure or rule system of any complexity, in an objective and secure manner. The method relieves the players of the often cumbersome, error prone management tasks, associated with complex games, which substantially degrade the enjoyment of the game. Such a method is advantageous, in particular, when the players develop game situations over a long period of time, and when they enrich the game situation increasingly with new game elements, thus continuously increasing its complexity.

The situation is present, in particular, in role- or fantasy games. In such games, which are often being played in computer networks, but which are also partially executed through a physical game plan, e.g. in connection with game cards exchanged by the players, particular players control a series of game status through certain game figures, or certain game situations. Additionally, they also create game figures, or game characters, or game situations, or they thus combine certain predetermined base features in the context of the game operation.

Thus e.g. trading card games, like e.g. the known Pokemon® card game, are customary, in which cards are distributed, representing game figures with certain features, e.g. "good" and "bad" fantasy monsters or robots with predetermined particularities and features, wherein these game figures, on the one hand, interact in a predetermined manner with other game figures, and, on the other hand, can be combined into new game figures in the context of the game operation, this means they are subject to a "mutation", operated by the players.

The game figures thus created, this means the "mutated creatures", increasingly represent, in combination with these game operations, the particular skill or cunning of the respective player, who has created this figure and operates it. The player thus moves into the identity of the game figure, and the combats performed in the framework of the game between his figure and other competing figures thus constitute combats showing the individual fantasies and skills of the player in a representative manner. The game figures thus assume quasi "individual features". They are not only figures in a game, but they increasingly refer to their owners. This in particular constitutes the allure of such games.

The attractiveness and the allure of such games is already increased by the fact that the player can loan or sell his "creations" to other players in the context of the game operation and the rules of the game, or can "trade" them in another manner. As the creator of the figure, he certainly claims authorship in some manner, and, therefore, it is mandatory to provide the created game figure with a protection, which indicates his authorship. In fantasy games, which are played in real life, this task is performed by a game manager, which registers the game figures and acts as a referee in case of an argument. It is appreciated that this task can become increasingly complex and confusing, the longer the game lasts. Errors and unclear situations, but also willful manipulations, thus cannot be excluded.

In the advantageous method cited in the said Patent document, such a game manager function is not provided. The players can certainly protect their game figures or game scores through protecting their personal access data, and thus their game figures, or game situations through entry of a password, a PIN, or biometric data, from unauthorized access. These means, however, must not play a role in the game operation, in particular, they must not be disclosed. While a game or its rules, and the game situations resulting there from, can basically be completely unclear, arbitrary, treacherous and conniving, thus constituting the main attraction of the game in many cases, it is absolutely necessary at the system level, this means in particular in a game console or the network game, that the system integrity, and thus the physical prerequisite for performing the game is maintained and not manipulated. Thus it is prohibited for this reason right from the beginning, to integrate the safety means disclosed or proposed in said Patent document, into the game operation in any way whatsoever, or to soften them only in some respect, since the system integrity is thus compromised.

The score keeping device according to DE 100 63 412 A1 thus lacks an authority, which is independent and strictly separated from the safety devices of the system, which e.g. monitors the allocation of the game figures at game level, thus managing the game and thus controlling it in a unambiguous manner in the sense of the previously agreed rules of the game. The said score keeping device, or the method, control a game operation, which is basically without hierarchies, but also rigid. It does not provide a referee or management function, acting from within the game. Therefore, it does not comply at all with the increased requirements of demanding fantasy- or role games.

OBJECTS AND SUMMARY OF THE INVENTION

Thus, there is the object to refine the score keeping device disclosed in DE 100 63 412 A1, or the method associated with this device, in a suitable manner, so that the score keeping device can fulfill a game manager function, and satisfy, in particular, the previously announced requirements of complex fantasy- and role games, or of related games completely. This task shall certainly be performed with a minimum of additional equipment- or implementation effort.

This object is accomplished with a method for unambiguous personal association of at least one autonomous storage unit to at least one player in a score keeping device for storing a score of a game, according to the features of claim 1.

The method according to the invention is characterized in that an unambiguous identification feature that is effective in the game environment, is allocated to a game status, unambiguously designating the actions of the player, created and/or managed by the player, characterizing him in an unambiguous manner, and stored in the at least one autonomous storage unit, said game status being in particular a sum of features of a game figure created and/or managed by the player, and/or a group of game situations created and/or managed by the player within the group of players detected by the score keeping device.

The game status created by the player, this means the game figure or the sum of features, which describes this game figure or the game status, is stored in the autonomous storage device of the player and can interact with other game figures or game conditions within the group of players, thus it receives a identification feature, which refers to the player, who has created this game figure. The game status thus receives a quasi label, or a sticker, which refers to the original author of the game figure, basically independent from the fact, which player, has access to this game figure or the game status at the present moment.

Differently from the bare release of "hard" access data, which is not acceptable for system integrity, thus PIN, password, and similar, with the method according to the invention, an unambiguous link between game status and game figure is provided, which is only effective and visible within the game operation. The player thus leaves a characteristic signature within the game operation, provided as the game figure created by him, or the game operation. He is thereby connected with its game figure in the game operation in an unambiguous manner, independent from the fact, if he or another player uses this game figure. The game figures or the game situation thus carries the sticker of the person, who has created it, in other words, the game figure, or the game status is not exchangeable and anonymous anymore, the game figure or the game situation are, in principle, connected to the player in a non separable manner in the game operation, and can be traced back to him in the game at any time.

Accordingly, a registering data exchange is performed for this purpose between the at least one autonomous storage unit, and a game manager storage unit managing the at least one autonomous storage unit. As a result of the data exchange, a first registered dataset, linked to the stored game status, identifying the player, is stored in the game manager storage unit, and a second register dataset, comparable to the first register dataset, in particular, identical dataset, which is linked to the stored game status, is generated in the autonomous storage unit, stored and processed. This registering data exchange avoids an arbitrary and uncontrolled allocation of identifiers through the player to certain game status, in particular, to its game figures. Furthermore, an official authorization of the game status is performed through the game manager storage unit. The game manager storage unit is thus a necessary prerequisite, so that the game status can be associated with the player. The identical register datasets in the game manager storage unit and in the autonomous storage unit, hereby, allow an always easily executable and producible proof regarding a correct allocation of the identifying feature.

Appropriately, the registering data exchange can be performed in the following manner. Initially, a first component of a memory identifier is transferred from the at least one autonomous storage unit to the game manager storage unit. Directly thereafter, or substantially simultaneously, a first component of a game manager identifier is transferred from the game manager storage unit to the autonomous storage unit. In the game manager storage unit, the first component of the memory identifier is linked with a second component of the game manager identifier into the first register dataset. Furthermore, in the first autonomous storage unit, the first component of the game manager identifier is linked with a second component of the game manager identifier into the second register dataset, and allocated to the game status.

The two register datasets, which are present now, identically in the autonomous storage unit, as well as in the game manager storage unit, now form the player's specific identifier of the game status, this means of the game figure and/or the game situation. The component of the register dataset originating from the game manager storage unit, thereby, forms an official centrally determined certification of the identifier, while the components of the register dataset, transmitted by the autonomous storage unit, supply the player specific component of the register dataset. The register dataset is thus only complete and valid, when both components are transmitted, replaced, and linked with each other. The identifying feature can neither be allocated alone by the autonomous storage unit, nor by the game manager storage unit. Thereby, respective manipulations contradicting the rules of the game are made more difficult.

Appropriately, the first register dataset is processed in the game manager storage unit. The game manager storage unit hereby functions as a local game manager storage unit for a limited amount of autonomous storage units, and thereby for a limited group of players.

In an advantageous variant of the method, the first register dataset is transmitted by the game manager unit to a superimposed player database. The game manager storage unit hereby functions as a local registration device for a limited amount of autonomous storage units or a group of players, while the actual administration of the register datasets is performed by a non local or global player database.

Thus, in a further advantageous embodiment of the method, the first register dataset in the game manager storage unit can be processed, and also transmitted to the superimposed player database. In this case, the game manager storage unit forms a local game manager storage unit, as well as also an intermediary station, or interface station to the global player database.

In at least one booking processes of the autonomous storage unit, which follows the registering data exchange, the first and the second register dataset is examined for congruence. Thus it is avoided, that either in the autonomous storage unit alone, or in the player storage unit, or in the player database alone, not allowed manipulations can be performed at the register datasets.

During the course of a game, a continuous update of player specific data, in particular, an update of current game status data, accomplished game scores, positions in a player list, of the first, and also of the second register dataset, are performed. The first and the second register dataset, in this case, additionally form an always current history of the player specific game status, which can be checked for correctness at any time.

A score keeping device for performing a method according to one of the said features, includes at least one game manager storage unit, integrated into the score keeping device, and an entirety of stored and processed game status, linked to a first register dataset in the game manager storage unit, and a second register dataset, identical to the first register dataset, and linked to the stored game status in the autonomous storage unit with a unambiguous allocation to at least one player.

The game manager storage unit is provided in an appropriate embodiment as a game manager card in the form of a transponder chip card, legible through a card reader, connected to a player console. The chip card includes a card shaped base body, with a memory chip integrated into the base body, and a data transmission device, connected to the memory chip. Chip cards are a common and easy to handle storage medium, which, in particular, can easily be personalized and secured for the selected group of persons, this means the game manager(s).

In an embodiment of the chip card, the data transmission device is provided as an electric contact field.

In another embodiment, the data transmission device is provided as a touch free transponder device. The embodiment as a transponder device is thus advantageous in particular. It is robust against voluntary destructions, this means vandalism, and enables a chip card operation with the help of an energy supply performed by the transponder device, in the form of an electric high frequency field without a battery or an accumulator device integrated into the chip card.

In a further advantageous embodiment, the game manager storage unit is provided as a modular component of a game console. This embodiment allows equipping a game console directly with the said function of the game manager storage unit.

In an appropriate manner, the game console has an interface for a network connection, in particular, an internet connection and/or a connection with a superimposed data storage device. These embodiments allow a previously described data exchange between the game manager storage unit and the superimposed player database.

The method according to the invention and the device for performing the method will be subsequently described in more detail with reference to embodiments. The FIGS. 1 through 6 shall be used for illustration purposes. The same designations are being used for identical or analogous process steps or components.

BRIEF DESCRIPTION OF THE DRAWINGS

It is shown in.

DETAILED DESCRIPTION OF THE INVENTION

Figure 1:
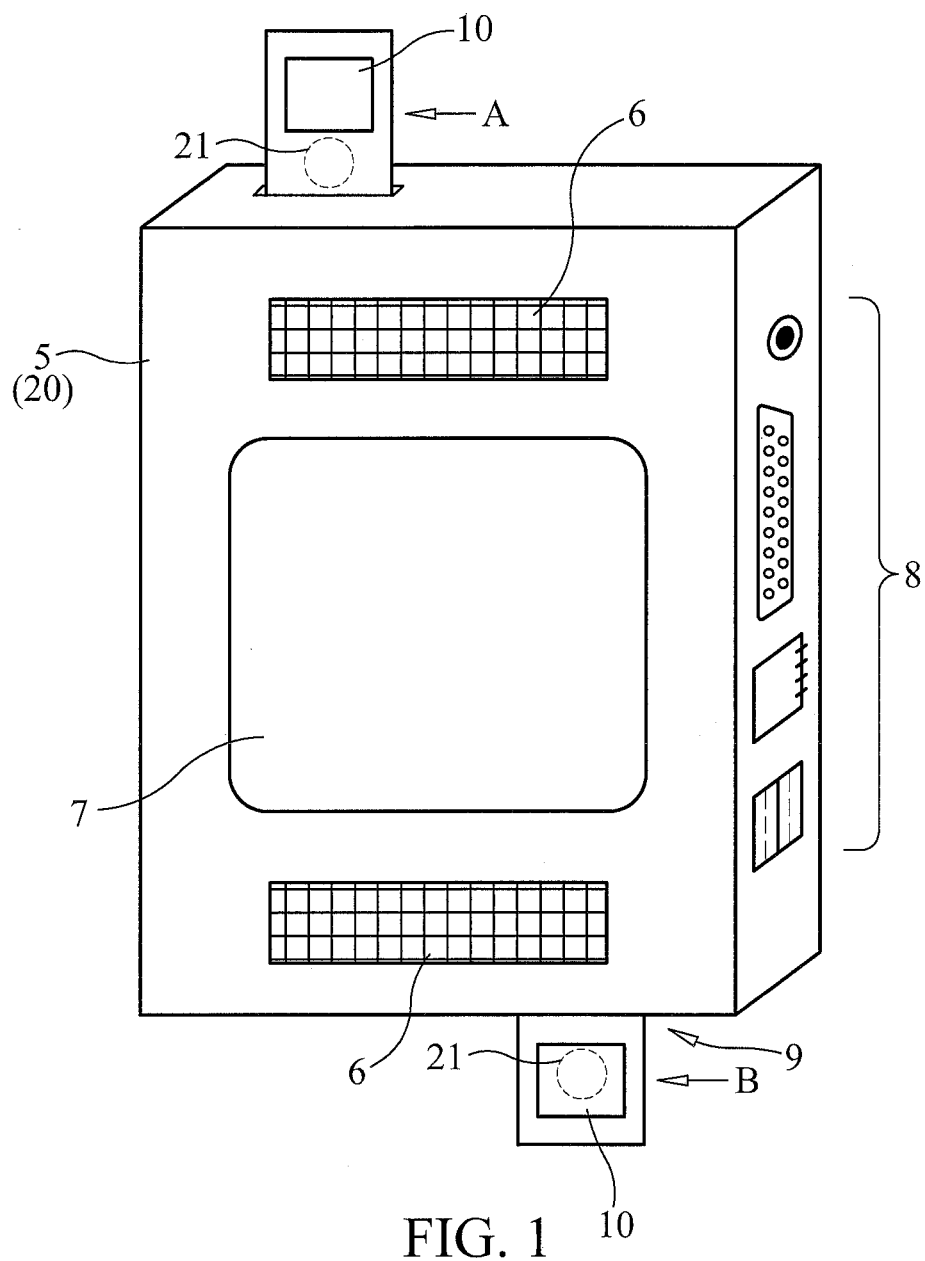
FIG. 1: an exemplary game console with autonomous storage units in an embodiment known in the state of the art.

FIG. 1 shows an exemplary game console 5 according to the state of the art, disclosed in DE 100 63 421 A1. The game console includes keyboards 6 or comparable entry means for game control. The game itself can be watched or played on a display 7 integrated into the game console. A series of different interfaces or outputs 8 allows a communication of the game console with an external computer- or data network, in particular, the internet. In this example, each of the players has this one autonomous storage device 10, inserted into the reader device 9. The autonomous storage device 10 is realized in the form of chip cards in the example illustrated in FIG. 1. The reader device 9 is therefore a chip card reader. Instead of the chip cards, certainly also diskettes and other storage media can be used, which are appropriately configured for the read/write operations, and therefore allow any number of updates.

Each of the two autonomous storage devices stores game situations or game status 21, which are put out as results of a game performed on the game console. These game status can be, in particular, data generated by the players A or B for game figures or game characters, which fight or interact with each other, e.g. on the game console.

The access to the data, included in the autonomous storage devices 10, can be secured in the device from FIG. 1 through a pin, a password, or in another manner, so that an unauthorized use of the autonomous storage devices through the respective other player is avoided. In the state of the art, shown in FIG. 1, the players A and B can leave the data of the game conditions 21 to each other, or mutually swap them. This is possible through one player simply transferring its game status to the other. Thus, however, any information is lost with respect to, the game status having been generated by A or B. The game status 21 are thus replaceable with respect to the players A and B. As a matter of principle, it is not possible therefore to e.g. judge the playing skills of player A or B, or to allocate the game status 21 on the external storage devices 10 or within the game console 5 to the players A or B in an unambiguous manner. In the extreme, the player A could have generated all game conditions 21, thus all game figures, game characters, fantasy figures, etc., while the player B only operates with the game conditions created by player A. It is understood, that under these conditions, tournaments or championships, using the game status 21, cannot be performed, since basically not the actual players A and B compete with each other, but only their game status 21 created in any way. On the other hand, the player B could use the game status of the player A in the device shown in FIG. 1, through the player A telling his safety relevant access data, thus e.g. his PIN, to the player B, so that B can use the game status of A. In this case, however, system integrity would be compromised, and would depend on the course of the game. This, however, needs to be avoided under all circumstances.

Figure 2:
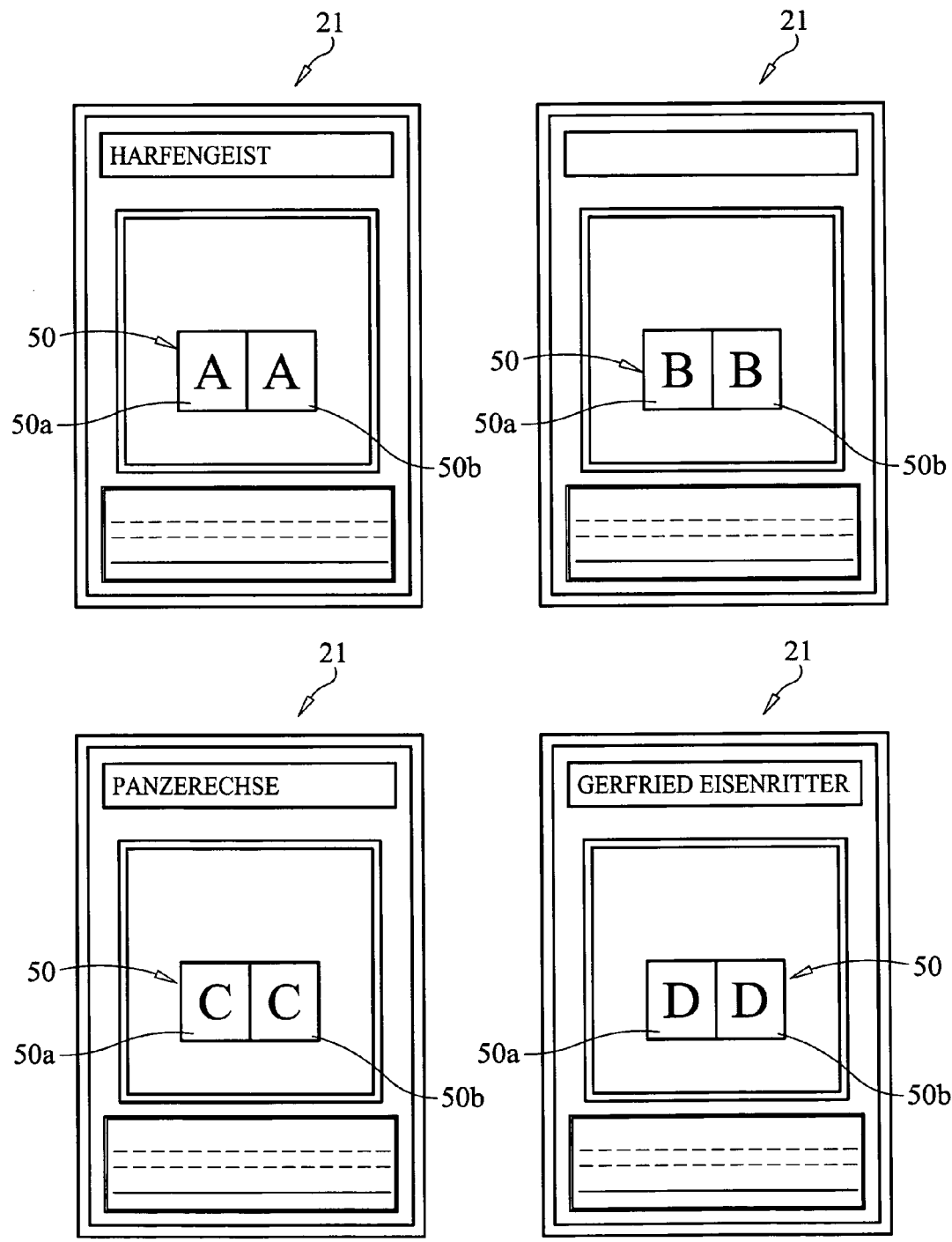
FIG. 2: a number of exemplary game figures in an exemplary fantasy/role game with a player specific memory identifier, before the beginning of the registering data exchange.

FIG. 2 shows some exemplary game status 21 in the form of exemplary game figures of a fantasy role game. The game status 21, shown in the Figure in a symbolic manner, can be given in the form of data, stored on the external storage devices 10, and possibly fed into the game console. Furthermore, also a realization of the game figures in the form of playing cards is possible, which can be written or read in a suitable manner. In a very simple embodiment, the cards can be written or imprinted manually, or they can have fields for individual indicators to be glued on, or affixed in another way, while the game properties of the game figures are simply provided through a text.

The playing cards can e.g. also have a magnetic strip or a chip, storing the game properties of the game figure. In this case, a game figure would practically be identical with an external storage device 10, while, typically, an external storage device 10 can store several game conditions 21, thus several game figures.

Subsequently, during the description of an embodiment, game conditions 21 are being used as bases, which are exclusively exchanged in the form of electronically stored data, and which are therefore useable for the application in a typical game console, or useable in a computer. In this context, it is also assumed, that the process steps described in the following are only performed electronically. The fact, that it is also possible, to transfer the necessary information and data in another way, remains unaffected thereby, and can be realized by a person skilled in the art.

To the game conditions 21 from FIG. 2, memory identifiers 50 are allocated, each referring to respective the player, which has generated this game status or game figure. Thus e.g., the game figure "Harfengeist" has been created by the player A and has been equipped with a series of certain characteristic features, which let him interact in a previously agreed manner in an electronically performed fantasy game with other game figures. The player B, in this example, has not generated a game figure, but a certain game situation, which influences the game operation as "last offer" in any other specific manner. Herein, the memory identifier 50 refers to the player B. In an analogous manner, the game figures "Panzerechse" or "Gerfried Eisenritter" have been created or designated by the players C or D. It is believed that the terms "Harfengeist", "Panzerechse"and "Gerfried Eisenritter" are trademarks of Konami Corporation of Tokyo, Japan. The memory identifiers 50 from FIG. 2 are substantially created individually by the players A, B, C, or D, and allocated to the game conditions 21. They include at least unambiguous information, sufficiently identifying the respective player, e.g. unambiguous user numbers or nicknames, not necessarily the real name of the actual participant.

Figure 3:
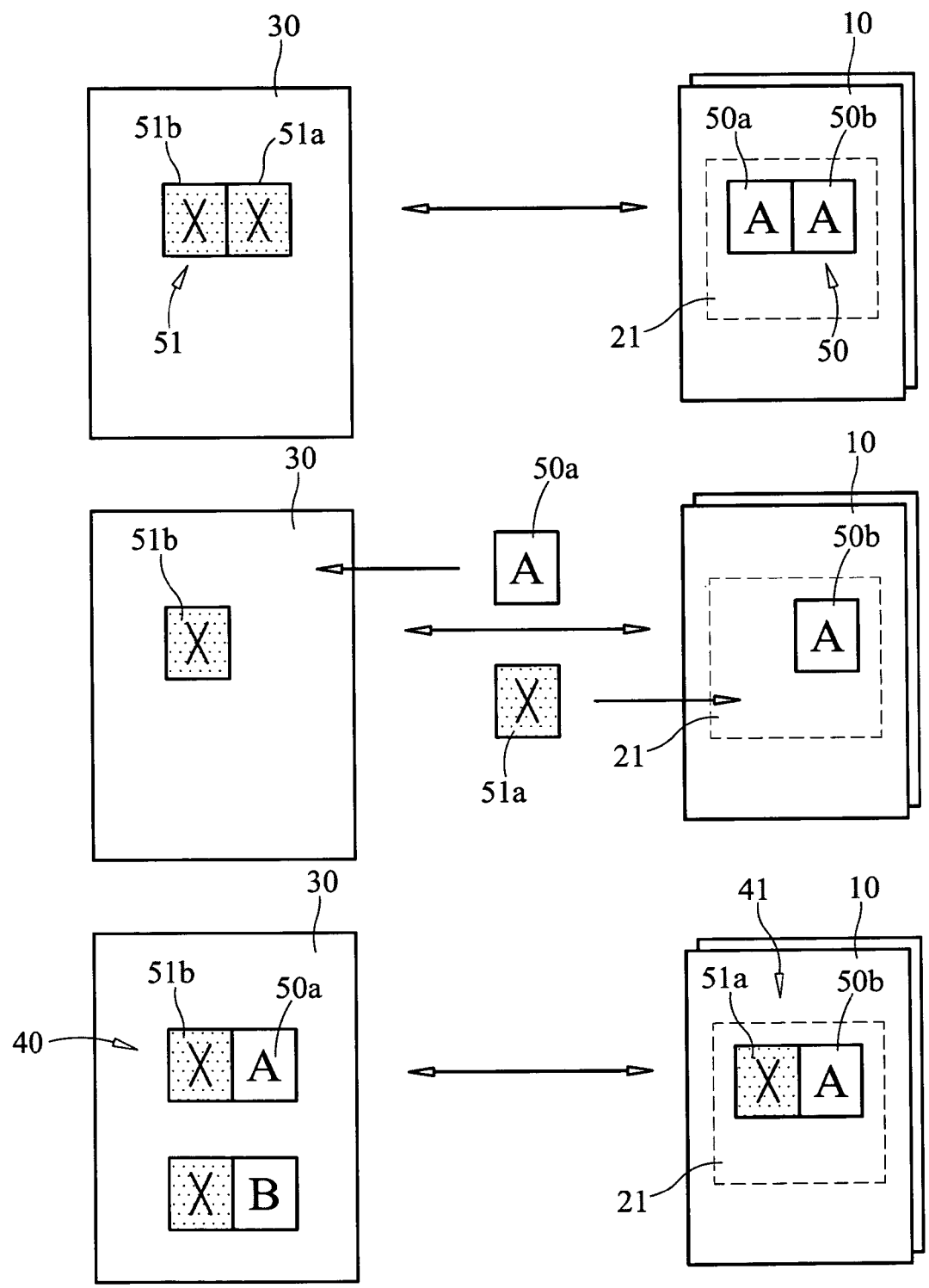
FIG. 3: an exemplary sequence of a registering data exchange between a game manager storage unit and an autonomous storage unit.

An exemplary registering data exchange and the assembly of a register dataset are shown in FIG. 3. The data exchange is performed between the autonomous storage unit 10 and the game manager storage unit 30. According to the preceding embodiments, the game status 21 is stored in the autonomous storage unit 10 with the storage identifier 50. The storage identifier 50 in this embodiment is comprised of two essentially identical components 50A and 50B. These components identify the player, in this case, in an exemplary manner the player A, in an unambiguous manner. The data within the storage identifier 50, or in the components 50A and 50B do not have to be safety relevant user data of the participant in a narrow sense. They only have to satisfy the basic condition that the player can be at least unambiguously identified for the score keeping device.

The score keeping device 20 includes a stored game manager identifier 51 in an analogous manner, identifying the game manager storage unit in an unambiguous manner. The game manager identifier 51, basically like the storage identifier 50, is also comprised of two substantially identical components 51A and 51B. Also here, it is not necessary at all, that the game manager identifier 51 includes safety relevant data. It only has to be unambiguously identifiable in a manner corresponding to the rules of the game during the course of the game. It can e.g. be a fantasy name which plays an important role in the game performed. In the example shown in FIG. 3, the game manager storage unit is unambiguously designated through an X relative to the player A, or relative to all other players.

The registering data exchange now is performed in an exemplary manner, so that the first component 50A of the storage identifier 50 is transmitted to the game manager storage unit 30. Time wise parallel to it, or also with a certain appropriate time lag, the first component 51A of the game manager identifier 51 is transferred to the autonomous storage unit. As a result of this data exchange a register dataset is now provided, in the game manager storage unit 30, as well as in the autonomous storage unit 10. The first register dataset 40 is stored in the game manager storage unit 30, and is comprised of the first component 50a of the storage identifier 50 and the second component 51b of the game manager storage identifier 51. The second register data set 41 is saved in the autonomous storage unit 10, and comprises the first component 51a of the game manager identifier 51 and the second component 50b of the storage identifier 50. The second register dataset 41 is initially allocated to the game status 21 in a non changeable manner, and identifies it in the autonomous storage unit 10 and, furthermore, its activities within the performed game.

The first register dataset 40 in the game manager storage unit 30 forms a registration entry, or an unambiguous data signature for the monitoring and control of the activity of the player or the game status directed by him within the course of the game, this means within the procedures executing there, game steps or data operations. The game status 21 is thus officially certified at the level of the game execution, and officially certified and "baptized" through an agreement of the player A and the game manager X.

Figure 4:
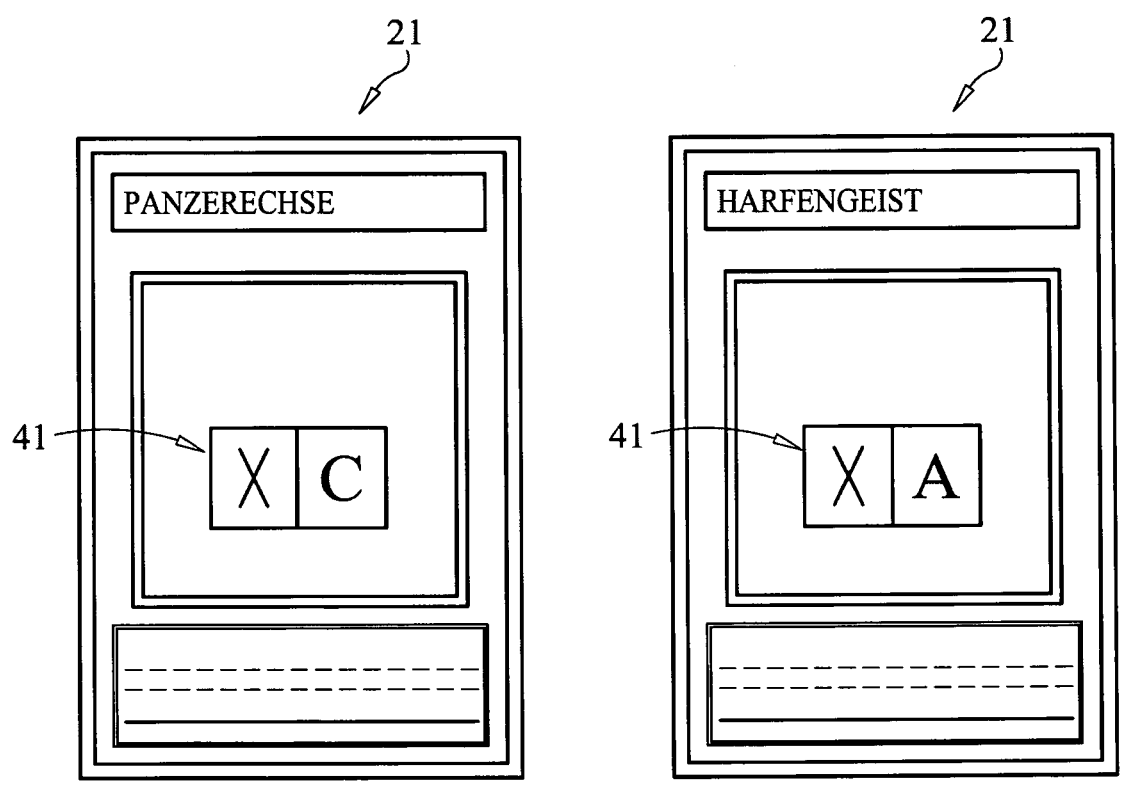
FIG. 4: exemplary game figures from FIG. 2 after performing the registering data exchange according to FIG. 3.

This means e.g. that, as shown in FIG. 4, the game status 21 identified with the name "Harfengeist" is allocated to the player A, wherein the game manager X officially certifies this fact. In an analogue manner, the game status designated in FIG. 4 with the name "Panzerechse" is unambiguously and officially associated with player C. The acting of the thus identified game status "Harfengeist" or "Panzerechse" is now recognizable within the game system as acting of the players A or C, and accessible to further processing within the game.

Figure 5:
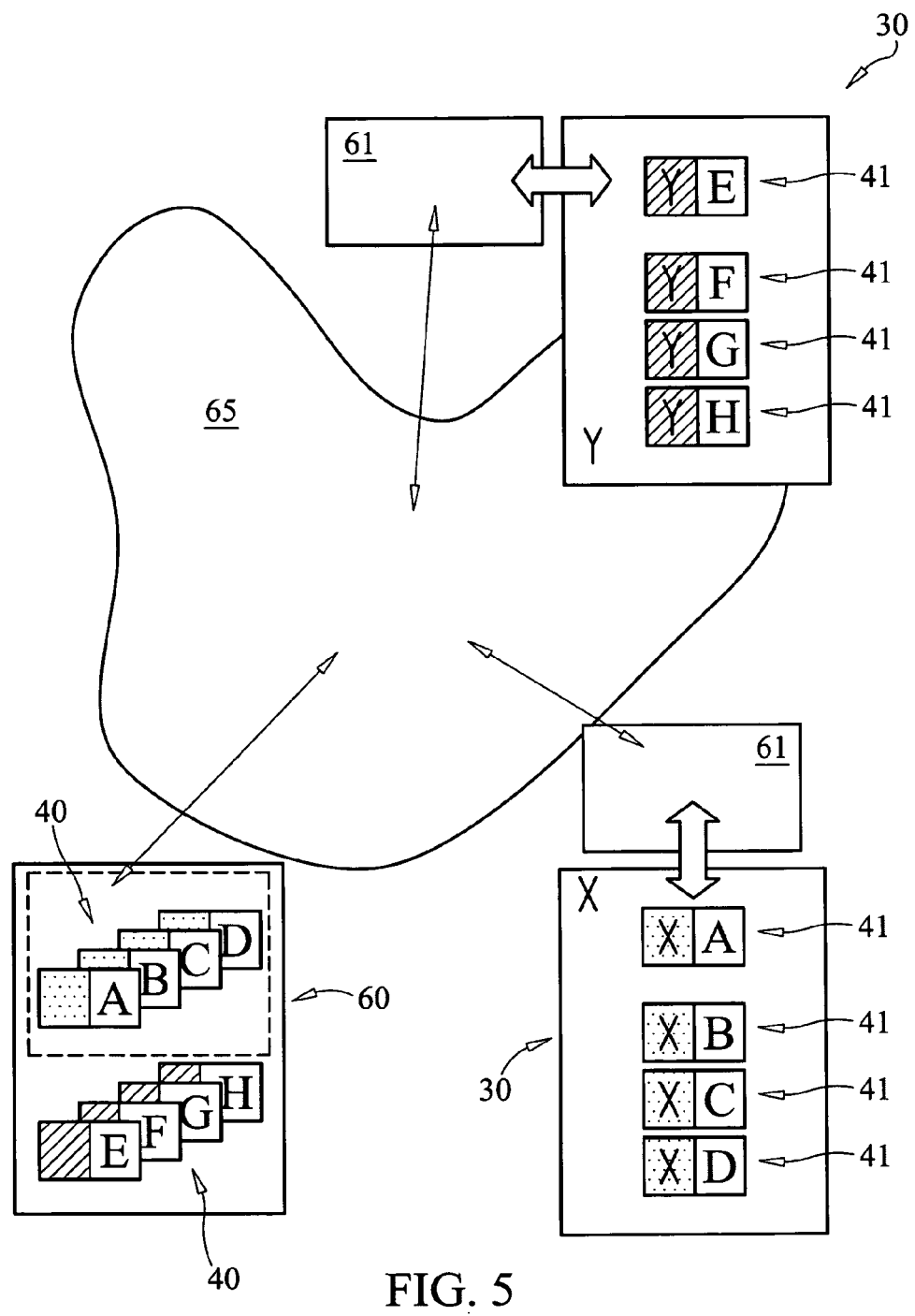
FIG. 5: a schematic exemplary network configuration from two game manager storage units in connection with the associated game consoles or computers and a superimposed player database.

Such procedures are advantageous in particular in complex network games, in which several subunits with several game managers communicate amongst each other, and in which an overview over the entire course of the game has to be maintained in the network at any time. FIG. 5 shows an example with this respect. Hereby, two game manager storage units 30 are provided, which are provided with the designations X and Y within the network. The network game is managed by a superimposed database 60, which stores e.g. game scores, or intermediary game scores, or which manages high score lists. The game manager storage units 30 interact via a respective network access 61, which can e.g. be provided through a network capable game console or a computer, within the a network 65, which can in particular be the internet or another local or non local network, e.g. a LAN.

The game manager storage units 30 manage a series of registration datasets 40 of a limited group of players, e.g. the register datasets YE and YF for game status, which are allocated to the players E or F, and which report to the game manager Y. Accordingly, the registration datasets XA and XB define game conditions of the players A and B under the management of the game manager X. The game managers X and Y thus manage the game operation of their respective area. The superimposed database 60 thus registers and manages the game operation in the areas of responsibilities of the game managers X and Y at high level. Thus it is easily possible, that the database 60 itself can be a game manager storage unit with the previously described functions. The network game can thus be hierarchically structured in any way. Thus it is easily possible, to perform comparable registering data exchange operations between the database 60 and the game manager storage units 30, as e.g. between the game manager units storage 30 and the autonomous storage units 10. Thus some players or the game status created by them, can act in the entire network in an overreaching manner, while only a local effectiveness is allocated to others. Thus, in particular, the opportunity is created to first play locally, and to compete in regional competitions later, after complying with predetermined criteria.

It should be emphasized, that the other processing of register datasets, in particular, the display disclosure, deleting or allocating, are basically independent of any, also only initially safety relevant aspect of the system integrity. The processing of the register datasets, or also of the game status linked therewith is only subject to the rules of the game to be executed. It can thus be as arbitrarily conniving, clear, complicated, or confusing, as required for the allure of the game. In the network structure shown in FIG. 5, e.g. in the area of the game manager Y, the register data sets can be managed completely differently, than in the area of the game manager X, or within the superimposed database 60.

The register datasets can e.g. be disclosed in the area of the game manager X for all players, and can be displayed in particular, wherein each player can unambiguously identify each game status, thus e.g. the game figures of the other players. Thus it is also possible to completely cover the register datasets, or to display them more or less in general, or depending on the game events, but to release the associated game status otherwise for each player. Thus e.g. each access to a game status by another player, than the one who has registered the respective game status, contributes to the advantage or disadvantage of his own position in high score. Eventually it is also possible that the players themselves, through setting certain parameters decide, which data sets are displayed in which form in public at all. In any case, however, through the register data sets, any and all game status are always linked to the players in a unambiguous manner through the registration data exchange, so that an assessment of the playing skills of each particular player is always possible.

Figure 6:
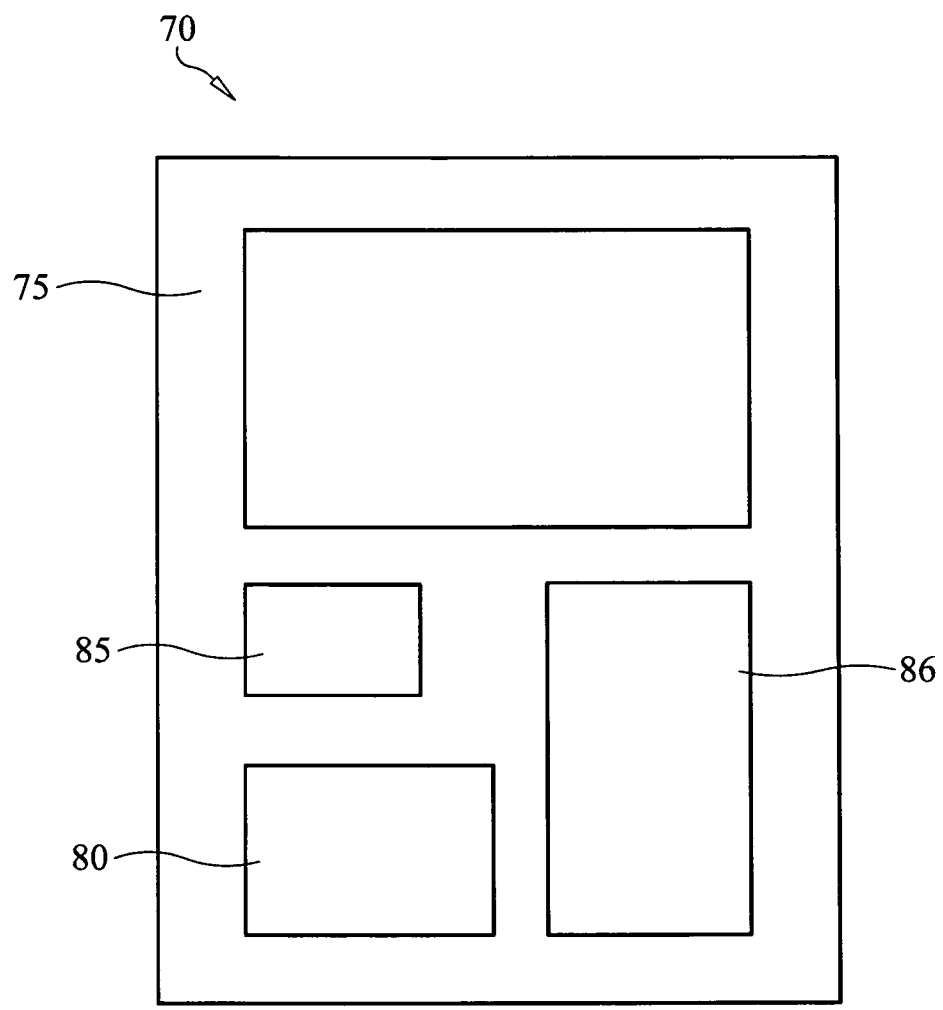
FIG. 6: an exemplary embodiment of a game manager storage unit shaped as a chip card.

The game manager storage unit can be realized in different ways. FIG. 6 shows an embodiment as a game manager card 70 provided as a chip card. In a card shaped base body 75 a memory chip 80 and a data transmission device 85 are integrated. Furthermore the chip card can also include a keyboard 86, e.g. provided as a simple foil keyboard. The chip card can be provided according to the known state of the art, thus e.g. the data transmission device 85 can be provided as a no touch transponder.

The physical access and thus the disposition of the chip card, or the data stored there upon is in no case an element of the internal game operations illustrated above, thus it is safety relevant, and thus has to be protected against data loss or unauthorized access in the interest of system security. For the protection of the data saved on the chip card, or against an unauthorized use of the chip card through unauthorized persons, the typical known safety procedures for chip cards and chip card readers, this means entry request for passwords or PIN, biometric data comparisons and/or data encryptions can be used. The chip card offers a simple opportunity to exchange game manager functions for a series of different games without great circumstance. The chip card can have a designation of the game on its card body for this purpose, e.g. provided as a logo.

Among other things it is useful under the aspect of system security, but also under the aspect of processing capacity, to have an embodiment of the game manager storage unit provided as a module, more or less integrated into a game console, or into a computer system, in particular as a circuit board, or plug in card, in the case of high data volume, or quasi permanently running net games. The game manager functions, at least certain base functions, which are unchanged during the game, can be realized in these embodiments in the form of software routines, which are accordingly installed in a solid state on the conductor card, or in memory elements disposed in the module, in particular ROM, PROM, or EPROM.

Eventually it is also possible to install the game manager storage unit in the form of a program or software module, installed in a game console, a local computer, or a host computer, and protected by the typical safety features.

Figure 7:
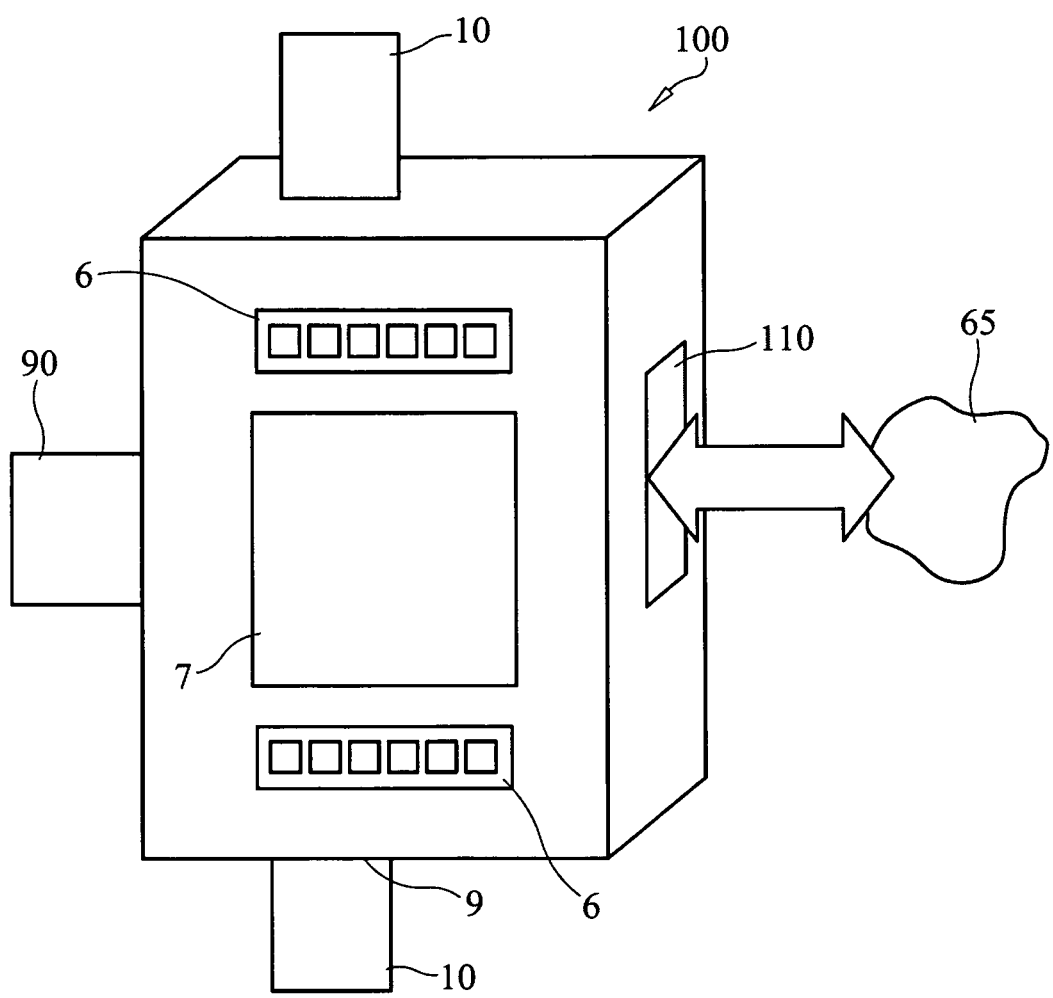
FIG. 7: an exemplary game console with a game manager storage unit shaped as a plug-in module.

FIG. 7 shows an exemplary embodiment of a game manager storage unit provided as a plug in module 90 for an application in a modified game console 100. The game console 100, with respect to its exterior configuration, mostly corresponds to the known embodiment according to the state of the art, shown in FIG. 1. It also has the keyboards 6 and the display 7, as well as the reader devices 9 for the autonomous storage unit 10. Furthermore an interface 110 for a communication with the external net 65, in particular the internet is provided. The interface is provided according to the state of the art standards. In the embodiment shown in FIG. 7, the plug in module 90 performs the previously described functions and process steps at least for the game console provided here. The game console 100 from FIG. 7 thus forms the hardware equipment platform for the game manager function. With respect to the external network 65 the game console 100 is defined through the plug in module 90, more or less an independent area of superimposed the network game. The game console 100 forms the location where the participating players physical log into the game operation running on the network 65, from where they interact with other players on the network.

Though the method according to the invention was described with reference to exemplary embodiments, it is appreciated that a person skilled in the art can perform numerous useful changes, additions or deletions, without going beyond the basic scope of the invention. Further embodiments can be derived in particular through useful combinations of the dependent claims.

| | Designations |
|---|---|
| 5 | Game console |
| 6 | Keyboard |
| 8 | Network Interface |
| 9 | Reader device |
| 10 | Autonomous storage device |
| 20 | Score keeping device |
| 21 | Game Status |
| 30 | Game manager storage unit |
| 40 | First register data set |
| 41 | Second register data set |
| 50 | Memory Identifier |
| 50a | First component |
| 50b | Second component |
| 51 | Game manager identifier |
| 51a | First component |

| | Designations |
|---|---|
| 51b | Second component |
| 60 | Superimposed data base |
| 61 | Network access |
| 65 | Network, in particular internet |
| 70 | Game manager card |
| 75 | Base Body |
| 80 | Memory chip |
| 85 | Data transmission device |
| 86 | Keyboard |
| 90 | Plug in module |
| 100 | Game console |
| 110 | Network interface |

What is claimed is:

1. A method for unambiguous association of at least one autonomous storage unit (10) with at least one player within a group of players registered in a network-capable score keeping device (20) for storing at least one game score of a game, which comprises the steps of:
associating an unambiguous identifier, effective in a game environment, designating the actions of the at least one player in an unambiguous manner with a game status which is at least one of generated and handled by the at least one player, characterizing the at least one player in an unambiguous manner and stored in the at least one autonomous storage unit, whereby at least one of 1) a sum of features of a game figure at least one of created and managed by the at least one player, and 2) a plurality of game situations at least one of generated and created by the at least one player within the group of players is registered in the score keeping device;
performing an exchange of registering data between the at least one autonomous storage unit (10) and a game manager storage unit (30) managing the at least one autonomous storage unit (10), wherein as a result of the data exchange a first register data set (40), linked with the stored game status, identifying the at least one player, is generated, stored and processed in the game manager storage unit (30), and a second register data set (41), identical to the first register data set, and associated with the stored game status is generated, stored and processed in the at least one autonomous storage unit (10);
wherein the step of performing an exchange of registering data includes the sub-steps of:
transmitting a first component (50a) of a storage identifier (50) from the at least one autonomous storage unit (10) to the game manager storage unit (30), the storage identifier (50) having the first component (50a) and a second component (50b), the first component (50a) including the same information as that of the second component (50b), the information identifying the at least one player, the second component (50b) not being transmitted to the game manager storage unit (30) and remaining in the at least one autonomous storage unit (10);
transmitting a first component (51a) of a game manager identifier (51) from the game manager storage unit (30) to the at least one autonomous storage unit (10), the game manager identifier (51) having the first component (51a) and a second component (51b), the first component (51a) including the same information as that of the second component (51b), the information relating to game status, the second component (51b) not being transmitted to the at least one autonomous storage unit (10) and remaining in the game manager storage unit (30);
linking the transmitted first component (50a) of the storage identifier (50) in the game manager storage unit (30) with the second component (51b) of the game manager identifier (51) remaining in the game manager storage unit (30) to form the first register data set (40); and
linking the transmitted first component (51a) of the game manager identifier (51) in the at least one autonomous storage unit (10) with the second component (50b) of the storage identifier (50) remaining in the at least one autonomous storage unit (10) to form the second register data set (41).

2. The method according to claim 1, which further comprises the step of:
transmitting the first register data set (40) from the game manager storage unit (30) to a superimposed game data base (60).

3. The method according to claim 1, which further comprises the step of:
processing the first register data set (40) in the game manager storage unit (30) and transmitting the first register data set (40) to a superimposed player data base (60).

4. The method according to claim 1, which further comprises the step of:
testing the first and the second register data set (40) (41) for conformity in at least one log in process of the autonomous storage unit (10) following the step of performing an exchange of the registering data.

5. The method according to claim 1, which further comprises the step of:
performing an update during the course of a game of relevant data of the at least one player in the first register data set (40) and in the second register data set (41), wherein the relevant data which is updated includes at least one of the game status data, the at least one game score of a game, and positions in a player list.

6. A score keeping device (20), which comprises:
at least one game manager storage unit (30); and
at least one autonomous storage unit (10) operatively linked to the at least one game manager storage unit (30), the at least one game manager storage unit (30) managing the at least one autonomous storage unit (10);
wherein the at least one autonomous storage unit (10) is unambiguously associated with at least one player within a group of players registered in the score keeping device (20), the at least one autonomous storage unit (10) storing at least one game score of a game;
wherein an unambiguous identifier, effective in a game environment, designating the actions of the at least one player in an unambiguous manner, is associated with a game status which is at least one of generated and handled by the at least one player, characterizing the at least one player in an unambiguous manner and stored in the at least one autonomous storage unit (10), whereby at least one of 1) a sum of features of a game figure at least one of created and managed by the at least one player, and 2) a plurality of game situations at least one of generated and created by the at least one player within the group of players is registered in the score keeping device (20);
wherein the at least one autonomous storage unit (10) and the at least one game manager storage unit (30) exchange registering data between the at least one autonomous storage unit (10) and the at least one game manager storage unit (30);
wherein the at least one game manager storage unit (30) generates, stores and processes a first register data set (40), linked with the stored game status, identifying the at least one player, as a result of the data exchange between the at least one autonomous storage unit (10) and the at least one game manager storage unit (30);

wherein the at least one autonomous storage unit (10) generates, stores and processes a second register data set (41), identical to the first register data set (40), and associated with the stored game status;

wherein the at least one autonomous storage unit (10) includes a storage identifier (50) having a first component (50*a*) and a second component (50*b*), the first component (50*a*) including the same information as that of the second component (50*b*), the information identifying the at least one player, the at least one autonomous storage unit (10) transmitting the first component (50*a*) of the storage identifier (50) to the at least one game manager storage unit (30), whereby the second component (50*b*) of the storage identifier (50) is not transmitted to the at least one game manager storage unit (30) and remains in the at least one autonomous storage unit (10);

wherein the at least one game manager storage unit (30) includes a game manager identifier (51) having a first component (51*a*) and a second component (51*b*), the first component (51*a*) including the same information as that of the second component (51*b*), the information relating to game status, the at least one game manager storage unit (30) transmitting the first component (51*a*) of the game manager identifier (51) to the at least one autonomous storage unit (10), whereby the second component (51*b*) of the game manager identifier (51) is not transmitted to the at least one autonomous storage unit (10) and remains in the at least one game manager storage unit (30);

wherein the first register data set (40) is formed by linking the transmitted first component (50*a*) of the storage identifier (50) in the at least one game manager storage unit (30) with the second component (51*b*) of the game manager identifier (51) remaining therein; and wherein the second register data set (41) is formed by linking the transmitted first component (51*a*) of the game manager identifier (51) in the at least one autonomous storage unit (10) with the second component (50*b*) of the storage identifier (50) remaining therein.

7. The device according to claim 6, wherein
the game manager storage unit (30) is provided as a game manager card (70), and wherein the device further includes a game console, and a card reader connected with the game console, the game manager card (70) being readable by the card reader, the game manager card (70) being provided as a chip card having a card shaped based body (75), a memory chip (80) integrated into the base body, and a data transmission device (85) connected to the memory chip.

8. The device according to claim 7, wherein the data transmission device (85) is provided as an electrical contact field.

9. The device according to claim 8, wherein the data transmission device (85) is provided as a touch free transponder device.

10. The device according to claim 6, wherein the game manager storage unit (30) is provided as a modular component in the form of one of a circuit board and a plug in module (90).

11. The device according to claim 7, wherein the game console (100) has an interface (110) for a network connection.

* * * * *

UNITED STATES PATENT AND TRADEMARK OFFICE
CERTIFICATE OF CORRECTION

| | | |
|---|---|---|
| PATENT NO. | : 8,702,521 B2 | Page 1 of 1 |
| APPLICATION NO. | : 12/932442 | |
| DATED | : April 22, 2014 | |
| INVENTOR(S) | : Robert Wilm | |

It is certified that error appears in the above-identified patent and that said Letters Patent is hereby corrected as shown below:

On the Title Page:

Item (73) Assignee should read

-- Manfred Rietzler, Bangkok (TH) --

Signed and Sealed this
Eleventh Day of November, 2014

Michelle K. Lee
*Deputy Director of the United States Patent and Trademark Office*